US006826040B2

(12) United States Patent
Wang

(10) Patent No.: US 6,826,040 B2
(45) Date of Patent: Nov. 30, 2004

(54) LAPTOP COMPUTER STRUCTURE

(75) Inventor: Cheng Hsien Wang, Taipei (TW)

(73) Assignee: First International Computer Inc., Taipei (TW)

( * ) Notice: Subject to any disclaimer, the term of this patent is extended or adjusted under 35 U.S.C. 154(b) by 92 days.

(21) Appl. No.: 10/326,093

(22) Filed: Dec. 23, 2002

(65) Prior Publication Data

US 2004/0120103 A1 Jun. 24, 2004

(51) Int. Cl.⁷ ............................................. G06F 1/16
(52) U.S. Cl. .................. 361/681; 361/683; 361/818; 361/680; 345/156
(58) Field of Search ...................... 361/680, 681, 361/683, 686, 816; 364/708.1; 360/137; 70/158, 159, 163–166; 312/223.1, 217, 216, 223.2, 222, 291; 248/118, 118.1, 63, 64, 128, 551–553, 106, 111, 119, 121, 917, 918, 900–902; 220/256, 326; 292/175, DIG. 72; 400/714, 715, 691

(56) References Cited

U.S. PATENT DOCUMENTS

| | | | | |
|---|---|---|---|---|
| 5,455,746 A | * | 10/1995 | Sato et al. ................... | 361/816 |
| 5,552,967 A | * | 9/1996 | Seto et al. ................... | 361/818 |
| 2002/0041269 A1 | * | 4/2002 | Ryuuzaki ..................... | 345/156 |
| 2002/0044408 A1 | * | 4/2002 | DeLuga et al. ............. | 361/680 |
| 2004/0027795 A1 | * | 2/2004 | Lee et al. .................... | 361/683 |

* cited by examiner

*Primary Examiner*—Michael Datskovsky
(74) *Attorney, Agent, or Firm*—Browdy and Neimark, P.L.L.C.

(57) ABSTRACT

A laptop computer includes a liquid crystal display (LCD) device and a host. The host has a cover and a base that snap fit with each other. The LCD device is pivotally connected to the base by a hinge. The host is easily maintained or upgraded without disassembling the LCD device, and can be directly tested after having been maintained or upgraded.

5 Claims, 4 Drawing Sheets

LAPTOP COMPUTER STRUCTURE

BACKGROUND OF THE INVENTION

1. Field of the Invention

The invention relates to a laptop computer. More specifically, the invention relates to a laptop computer in which the host is easily maintained or upgraded without disassembling the LCD device.

2. Description of the Related Art

The laptop computer is a compact and portable computer that minimizes the size of all of the electronic devices inside the casing with a thickness not exceeding more than two magazines. Reducing the size of the computer results in a reduced weight and a higher portability, substantially with the same performance as a desktop computer.

A conventional laptop computer includes a host and a liquid crystal display (LCD) device that are pivotally mounted in a manner to be capable of folding and unfolding relative to each other. However, when the host is to be maintained or upgraded, the LCD device has to be disassembled before the cover of the host is opened. This operation is time-consuming.

Furthermore, since the LCD device is disassembled from the host, the host cannot be directly tested.

SUMMARY OF THE INVENTION

It is therefore an object of the invention to provide a laptop computer, in which a LCD device is pivotally connected to a base of a host in such a manner that the host can be easily maintained or upgraded without disassembling the LCD device, allowing a quick maintainance.

It is another object of the invention to provide a laptop computer, in which after a cover of the host is removed without disassembling the LCD device, all of the electronic devices such as a CPU, a memory card and a hard disk are exposed. Therefore, the LCD device remains assembled with the host, and the host can be directly tested after being maintained or upgraded.

It is still another object of the invention to provide a laptop computer, in which the connection between a cover and a base of the host is achieved by screwing or by snapping for more easily disassembly of the cover from the base.

In order to achieve the above and other objectives, a laptop computer of the invention includes a liquid crystal display (LCD) device and a host. The host has a cover and a base snapping each other. The LCD device is pivotally connected to the base by a hinge.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
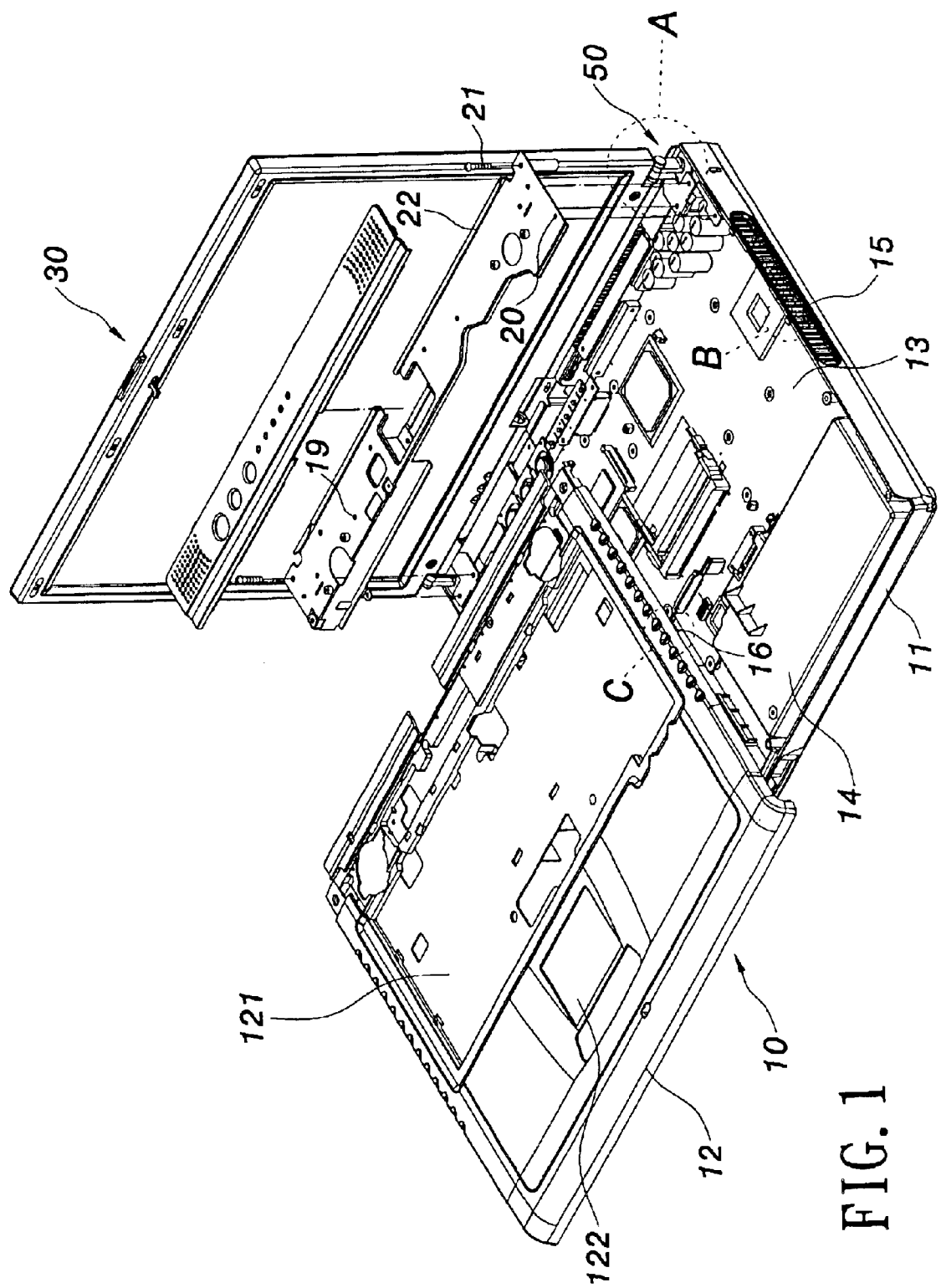
FIG. 1 is a partially exploded view of a laptop computer according to one embodiment of the invention.

Wherever possible in the following description, like reference numerals will refer to like elements and parts unless otherwise illustrated.

Figure 2:
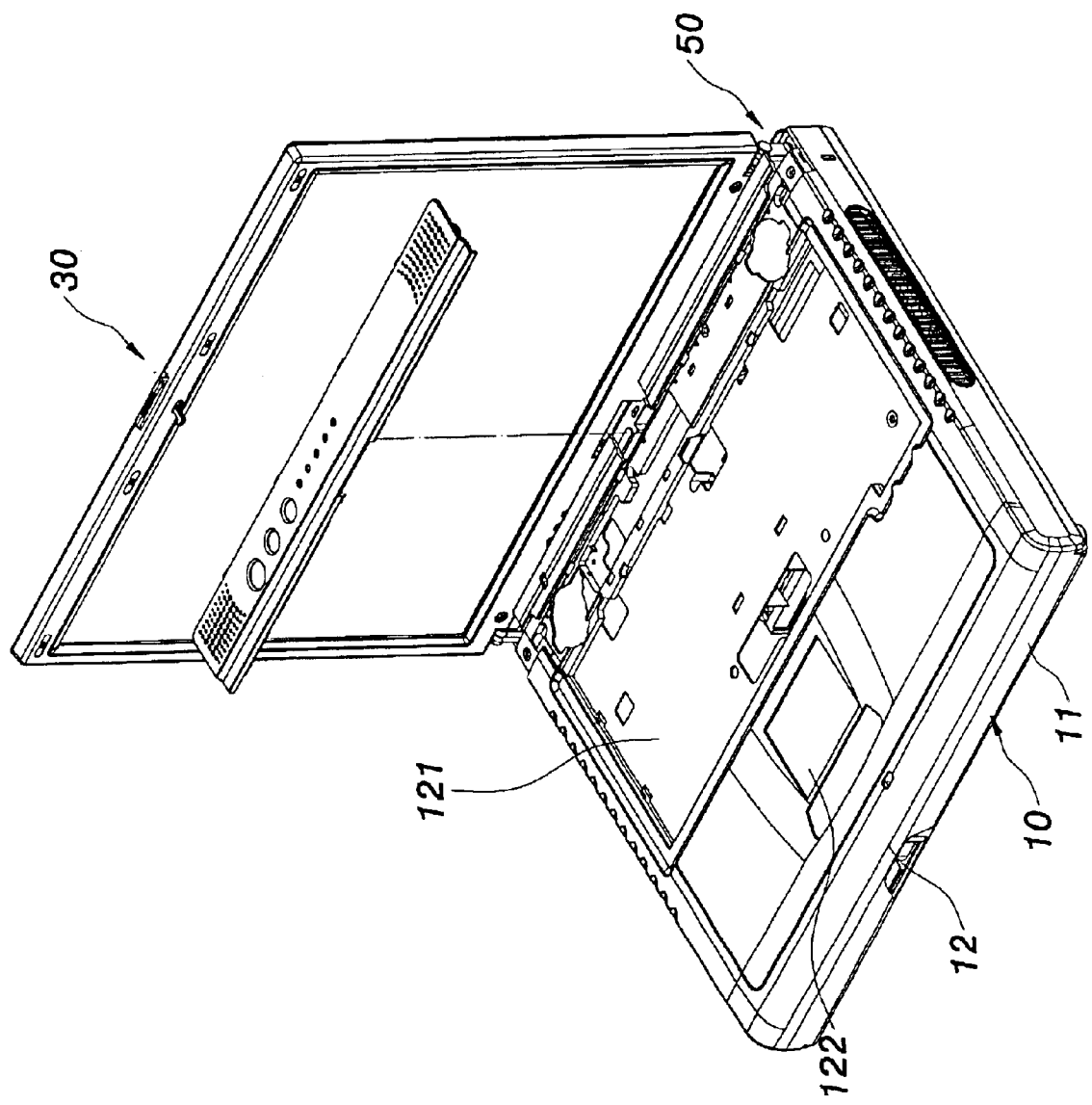
FIG. 2 is a perspective view of a laptop computer according to one embodiment of the invention.

Referring to FIG. 1 and FIG. 2, the invention provides a laptop computer that includes a host 10 and a liquid crystal display (LCD) device 30 pivotally connected to each other by a hinge 50. The host 10 and the LCD device 30 can be thereby folded and unfolded relative to each other.

The host 10 includes a housing consisting of a base 11 and a cover 12. A mainboard 13, a battery 14, a central processing unit (CPU), a memory card (not shown), etc. are mounted on the base 11. The cover 12 has a key-button section 121 and a touch pad section 122 for respectively mounting a plurality of key-buttons. and a touch pad. All of the electronic devices of the laptop computer are mounted in the host 10 according to a manner known in the art.

Figure 1A:
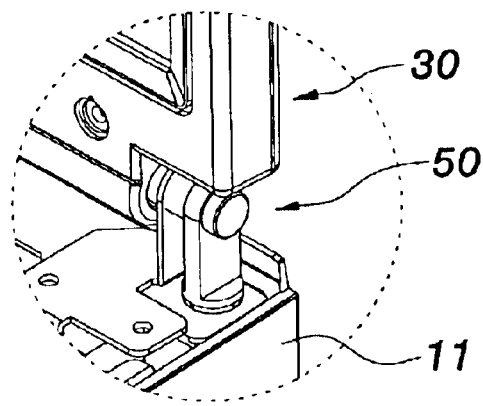
FIG. 1A is an enlarged view of part A of FIG. 1 according to one embodiment of the invention.

Referring to FIG. 1A, one end of the hinge 50 is attached to the base 11, and the other end is attached to the LCD device 30, so that the hinge 50 pivotally connects the base 11 of the host 10 to the LCD device 30.

Figure 1B:
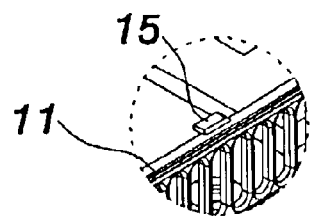
FIG. 1B is an enlarged view of part B of FIG. 1 according to one embodiment of the invention.
Figure 1C:
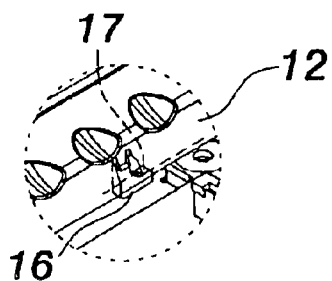
FIG. 1C is an enlarged view of part C of FIG. 1 according to one embodiment of the invention.
Figure 3:
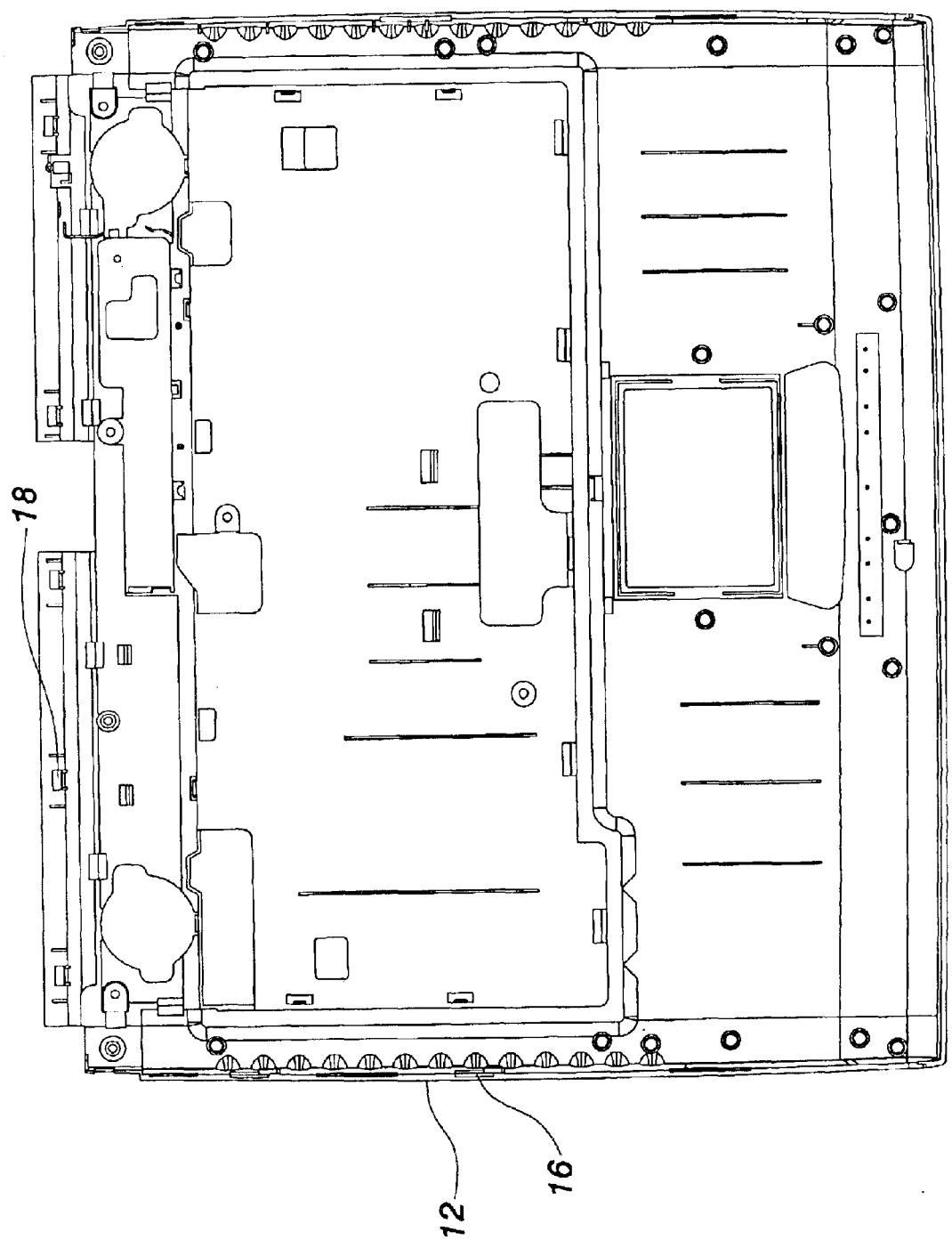
FIG. 3 is a bottom view of a cover of a laptop computer according to one embodiment of the invention.

Referring to FIG. 1B, a plurality of first snap tongues 15 are integrally formed at a right side and a left side of the base 11. A plurality of second snap tongues 16, respectively corresponding to the first snap tongues 15, are integrally formed at a right side and a left side of the cover 12, as shown in FIG. 1C and FIG. 3. Each of the second snap tongues 16 has a L-shaped contour and a sliding slot 17 therein.

The cover 12 is pushed toward the base 11 to allow the first snap tongues 15 to slide in the corresponding sliding slots 17 of the second snap tongues 16. Thereby, the cover 12 is attached to the cover 11 by respectively snapping the first snap tongues 15 with the second snap tongues 16. Referring to FIG. 3, a plurality of third snap tongues 18 are formed at a rear side of the cover 12. A fastening plate 19 having a plurality of fastening holes 20 is screwed inside the base 11 by inserting a screw 21 into each fastening hole 20.

A flange 22 is formed on a rear side of the fastening plate 19 by bending a portion of the fastening plate 19. When the first snap tongues correspondingly snap fit with the second snap tongues, the third snap tongues 18 of the cover 12 also snap fit with the flanges 22 of the fastening plate 19. Thereby, the base 11 is more firmly attached to the cover 12. The base 11 and the cover 12 may be further fastened with each other by screwing. Therefore, a laptop computer in which the host can be easily maintained without disassembling the LCD device is constructed.

As described above, the laptop computer of the invention has the following advantages.

1. The LCD device 30 is pivotally connected to the base of the host 11. Therefore, the host is easily maintained or upgraded without disassembling the LCD device 30, which allows a quick maintainance.

2. After the cover 12 is removed without disassembling the LCD device 30, all of the electronic devices such as the CPU, the memory card and the hard disk are exposed while the LCD device remains connected to the mainboard 13 (see FIG. 1). Therefore, the host can be directly tested after being maintained or upgraded.

3. The connection between the cover 12 and the base 11 is achieved by screwing. Alternately, a sliding slot is substituted for the snap tongue 16 to more easily disassemble the cover 12 from the base 11.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A laptop computer, comprising:

a liquid crystal display (LCD) device; and a host, having a cover and a base snap fitting with each other, wherein the LCD device is pivotally connected to the base by a hinge; and a plurality of first snap tongues formed at a right side and a left side of the base, and a plurality of second snap tongues respectively corresponding to the first snap tongues, and formed at right side and left side of the cover.

2. The laptop computer of claim 1, wherein each of the second snap tongues has a sliding slot, the cover is pushed toward the base to allow the first snap tongues to slide in corresponding sliding slots of the second snap tongues to snap fit the first and second snap tongues with one another.

3. The laptop computer of claim 1, wherein a plurality of third snap tongues are formed at a rear side of the cover, and a fastening plate having a flange is fixed inside the base, the third snap tongues of the cover snap fitting with the flange of the fastening plate.

4. The laptop computer of claim 3, wherein the fastening plate has a plurality of fastening holes through which a screw is inserted to fix the fastening plate to the base.

5. The laptop computer of claim 1, wherein the cover and the base of the host are further screwed to each other.

* * * * *